United States Patent
McSchooler et al.

(10) Patent No.: US 11,864,001 B2
(45) Date of Patent: Jan. 2, 2024

(54) ADAPTIVE 5G SYSTEM

(71) Applicant: DISH Wireless L.L.C., Englewood, CO (US)

(72) Inventors: Jeffrey Lang McSchooler, Parker, CO (US); Jennings Maxwell Orcutt, Denver, CO (US); David Robert Zufall, Lone Tree, CO (US); Christopher William Krasny Ergen, Littleton, CO (US); Mark Henry Gomez, Parker, CO (US)

(73) Assignee: DISH Wireless L.L.C., Englewood, CO (US)

( * ) Notice: Subject to any disclaimer, the term of this patent is extended or adjusted under 35 U.S.C. 154(b) by 134 days.

(21) Appl. No.: 17/372,690

(22) Filed: Jul. 12, 2021

(65) Prior Publication Data

US 2022/0303785 A1    Sep. 22, 2022

Related U.S. Application Data

(60) Provisional application No. 63/161,770, filed on Mar. 16, 2021.

(51) Int. Cl.
*H04W 16/18*    (2009.01)
*H04L 41/14*    (2022.01)
(Continued)

(52) U.S. Cl.
CPC ............ *H04W 16/18* (2013.01); *G06F 16/27* (2019.01); *H04L 41/046* (2013.01); *H04L 41/20* (2013.01); *H04W 24/02* (2013.01)

(58) Field of Classification Search
None
See application file for complete search history.

(56) References Cited

U.S. PATENT DOCUMENTS 10,594,034 B1 *   3/2020   Tran ......................... H01Q 1/04
11,310,719 B1 *   4/2022   Boschulte ........... H04W 40/248
(Continued)

FOREIGN PATENT DOCUMENTS

CN      111836269 A       10/2020
GB         2593499 A *     9/2021    ............ H04W 24/02
(Continued)

OTHER PUBLICATIONS

"Making the World Better for All", 2020, Publisher: Cardano; screen captured from the Internet on Mar. 16, 2021 at www.cardano.org.

(Continued)

*Primary Examiner* — Ajit Patel
(74) *Attorney, Agent, or Firm* — Wash Park IP Ltd.; John T. Kennedy

(57) ABSTRACT

An adaptive fifth generation (5G) communications system includes an adaptive 5G tower; a first adaptive 5G site coupled by a dedicated link with the adaptive 5G tower; and a second adaptive 5G site coupled by a direct link with the first adaptive 5G site. The direct link may be established by the first adaptive 5G site and couples the second adaptive 5G site with the adaptive 5G tower. Data signals may be communicated between the adaptive 5G tower and the second adaptive 5G site via the direct link and the dedicated link. Usage of the direct link is accounted for in a blockchain master ledger. The blockchain master ledger corresponds to an adaptive 5G model and may be separately maintained by each of the adaptive 5G tower, the first adaptive 5G site, and the second adaptive 5G site. The master ledger may include relay, processing, path, power, and transaction layers.

20 Claims, 4 Drawing Sheets

(51) Int. Cl.
H04L 41/00 (2022.01)
G06F 16/27 (2019.01)
H04W 24/02 (2009.01)
H04L 41/046 (2022.01)

(56) References Cited

U.S. PATENT DOCUMENTS

| | | | | |
|---|---|---|---|---|
| 11,632,390 | B2* | 4/2023 | Bartolucci | H04L 63/0421 726/22 |
| 2020/0186607 | A1* | 6/2020 | Murphy | G06F 16/2272 |
| 2020/0274765 | A1* | 8/2020 | Dasgupta | H04L 9/0643 |
| 2021/0168031 | A1* | 6/2021 | Stockert | H04L 9/0637 |
| 2022/0038289 | A1* | 2/2022 | Huang | H04L 63/12 |
| 2022/0190901 | A1* | 6/2022 | Hartman | H04L 1/18 |

FOREIGN PATENT DOCUMENTS

| | | |
|---|---|---|
| WO | 2020125992 A1 | 6/2020 |
| WO | PCTUS2220404 | 3/2022 |

OTHER PUBLICATIONS

"Creating a Worldwide Marketplace for Telco Assets.", 2020, Publisher: Dent Wireless; screen captured from the Internet on Mar. 16, 2021 at http://www.dentwireless.com/exchange.

"Welcome to Ethereum", Publisher: Ethereum, screen captured from the Internet on Mar. 16, 2021 at www.ethereum.org.

"Helium—Introducing the People's Network", Publisher: Helium, screen captured from Internet on Feb. 11, 2021 at www.helium.com.

Haleem et al., "Helium—A Decentralized Wireless Network", Nov. 14, 2018, vol. 0.4.2, Publisher: Helium, screen captured from the Internet on Feb. 11, 2021 at www.whitepaper.helium.com.

Manav Gupta, "IBM Block Chain for Dummies", 2020, Volume 3rd Limited Edition, Publisher: John Wiley & Sons, Inc., downloaded from the Internet on Feb. 18, 2021 at https://www.academia.ec/u141356692/Blockchain_fd_3rd_ibm_limited_edtion_83025393USEN_1_.

"Open Sea_Buy Crypto Collectibles", 2021, Publisher: OpenSea, screen captured from the Internet on Mar. 16, 2021 at www.opensea.io.

"Future of 5G", , Publisher: Qualcomm Technologies, Inc., downloaded from the Internet on Mar. 16, 2021 at https://www.qualcomm.com/documentsmaking-5g-nr-commercial-reality-0, Feb. 2020.

5G Waveform & Multiple Access Techniques, published Nov. 5, 2015; , Publisher: Qualcomm Technologies, Inc., downloaded from the Internet on Mar. 16, 2021 at https://www.qualcomm.com/media/documents/files/5g-research-on-waveform-and-multiple-access-techniques.pdf.

Anonymous: "3rd Generation Partnership Project; Technical Specification Group Radio Access Network; NR; Study on Integrated Access and Backhaul; (Release 16)"; 3GPP Standard; Technical Report; 3GPP TR 38.874, 3rd Generation Partnership Project (3GPP), Mobile Competence Centre ; 650, Route Des Lucioles ;F-06921 Sophia-Antipolis Cedex ; France, No. VI6.0.0, Jan. 10, 2019 (Jan. 10, 2019),pp. 1-111, XP051591643, section 6-9.

PCT/US2022/020404 Written Opinion of the Intl Search Authority, dated May 27, 2022.

PCT/US20222/020404 International Search Report, dated May 27, 2021.

PCT/US20222/020404, International Preliminary Report on Patentability, Notice.

PCT/US20222/020404, Notice of Transmittal of International Preliminary Report on Patentability, dated Sep. 28, 2023.

EPO Appllication Serial No. 22717956.1, Rule 161(1) Communication, dated Oct. 24, 2023.

* cited by examiner

ADAPTIVE 5G SYSTEM

TECHNICAL FIELD

The technology described herein generally relates to devices, systems, and processes for extending reach of 5G networks. The technology described herein also generally relates to devices, systems, and processes for providing adaptive networking, communication, data processing, signal processing, and other resources across distributed networks. The technology described herein also generally relates to devices, systems and processes for providing adaptively formed networks. The technology described herein also generally relates to the use of blockchains to establish, maintain, configure, adapt, transact, account, and otherwise use adaptive networks and adaptive data processing systems.

BACKGROUND

Today, fifth generation wireless technologies ("5G") are being deployed across the world. 5G commonly utilizes high frequency signals that may have limited signal range and are often subject to interference from physical objects and other signals. Accordingly, numerous adaptive 5G nodes are typically needed. The deploying of operator owned adaptive 5G nodes can be cost prohibitive and impractical. Accordingly, a distributed network of adaptive 5G nodes is needed. Further, a distributed 5G system commonly requires use of considerable electrical power, data processing capabilities, and the like. Devices, systems and processes for accounting for capabilities of a distributed 5G system, use thereof, and the like is needed. These concerns also arise with use mobile nodes in 5G systems.

SUMMARY

The various implementations of the present disclosure relate in general to devices, systems, and processes for facilitating adaptive 5G systems.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes an adaptive fifth generation (5G) communications system. The adaptive fifth generation system may include an adaptive 5G tower; a first adaptive 5G site coupled by a dedicated link with the adaptive 5G tower, and a second adaptive 5G site coupled by a direct link with the first adaptive 5G site. The direct link may be established by the first adaptive 5G site and may couple the second adaptive 5G site with the adaptive 5G tower. Data signals may be communicated between the adaptive 5G tower and the second adaptive 5G site via the direct link and the dedicated link. Use of the direct link may be accounted for in a blockchain master ledger. Other embodiments of this aspect include corresponding computer systems, apparatus, and computer programs recorded on one or more computer storage devices, each configured to perform the actions of the methods.

Implementations may include one or more of the following features. For an adaptive 5G communications system, a blockchain master ledger may correspond to an adaptive 5G model. The block chain master ledger may be separately maintained by each of an adaptive 5G tower, a first adaptive 5G site, and a second adaptive 5G site. The blockchain master ledger further may include a relay ledger. The relay ledger may account for communication of data signals with the second adaptive 5G site using the direct link. The relay ledger may correspond to a radio layer of an adaptive 5G model.

The first adaptive 5G site may be configured to perform adaptive data operations on one or more of the data signals communicated via a direct link to a second adaptive 5G site. The first adaptive 5G site further may include: a first adaptive 5G site adaptive data processing resource. The blockchain master ledger further may include a processing ledger. The processing ledger may account for data processing operations performed by the first adaptive 5G site data processing resource on the data signals. The processing ledger may correspond to a function layer of an adaptive 5G model.

An adaptive 5G communications system may include a common resource. The common resource further may include an Internet Service Provider (ISP). The ISP may be configured to provide access to an Application Service Provider (ASP). The ASP further may include a content streaming provider.

A first adaptive 5G site may facilitate access by a second adaptive 5G site to a content streaming provider via a direct link and the network link. A blockchain master ledger may account for use of the direct link and the network link by the second adaptive 5G site to access the content streaming provider. A network interface may operate at a path layer of an adaptive 5G model.

A blockchain master ledger may include a power ledger providing an accounting of electrical power used by the first adaptive 5G site to facilitate communication of the data signals using the direct link and the dedicated link. The power ledger may correspond to a transaction layer of an adaptive 5G model.

A first adaptive 5G site may include: an antenna and a transceiver coupled to the antenna. The antenna and the transceiver may facilitate a direct link and a dedicated link. The first adaptive 5G site may include a data storage device configured to a local copy of the blockchain master ledger, and a hardware processor, coupled to the antenna, the transceiver, and the data storage device, configured to execute non-transient computer instructions for facilitating a signal broker engine configured to manage use of the antenna and the transceiver for the direct link and the dedicated link.

The non-transient computer instructions further may include instructions for facilitating a data processing engine configured to manage use of adaptive data processing resources and common resources on behalf of a second adaptive 5G site. The common resource further may include an ISP. The ISP may be configured to provide access to an ASP.

The non-transient computer instructions further may include instructions for facilitating a transaction engine configured for participating in at least one of bidding, rationing, auctioning, allocating, and accounting for use of at least one of communications resources, the adaptive data processing resources, and the common resources.

The first adaptive 5G site may be further configured to establish a mobile direct link with an adaptive mobile device. The first adaptive 5G site may facilitates communication of mobile data between the adaptive mobile device and the adaptive 5G tower via the dedicated link and the mobile direct link. Implementations of the described techniques may include hardware, a method or process, or computer software on a computer-accessible medium.

One general aspect may include a transaction engine which accounts for uses of communications resources, adaptive data processing resources and common resources in the blockchain master ledger. Other embodiments of this aspect may include corresponding computer systems, apparatus, and computer programs recorded on one or more computer storage devices, each configured to perform the actions of the methods.

BRIEF DESCRIPTION OF THE DRAWINGS

The features, aspects, advantages, functions, interfaces, and components of the devices, systems and processes provided by the various implementations of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

The various implementations described herein are directed to devices, systems, and processes for providing adaptive 5G systems. Herein, "5G" refers to communications systems, protocols, and technologies which use, for uplinks and/or downlinks, one or more of Single-Carrier Frequency Division Multiplexing (SC-FDM), Orthogonal Frequency-Division Multiplexing (OFDM) waveforms and the like, with non-limiting examples including Cyclic Prefix OFDM (CP-OFDM), Orthogonal Frequency Division Multi-Access (OFDMA), Weighted Overlap and Add OFDMA (WOLA/OFDMA), Single-Carrier Frequency Division Multiple Access (SC-FDMA), and Resource Spread Multiple Access (RSMA).

Further, "5G" herein refers to various uses of frequency range allocations by governmental authorities, such as the United States Federal Communications Commission, (each allocation being a "5G band"). Other frequency allocations may be used in other jurisdictions. The 5G band allocations may include "High Bands" such as frequencies above twenty-four Gigahertz (24 GHz) (commonly also referred to as millimeter wave ("mmWave") frequencies), "Mid-bands" such as frequencies between one and six Gigahertz (1-6 GHz), and "Low Bands" such as those below one Gigahertz (1 GHz). It is appreciated that a 5G band used for a given implementation and/or at a given time will influence signal propagation, data rate, latency, power needs, and other signal characteristics. Other frequency allocations may be used in the U.S. and/or in other jurisdictions.

Herein, "Licensed RF" refers to communications systems, protocols, signals and technologies (herein, "technologies") which are configured for use with non-5G signals. Non-limiting examples include 1G, 2G, 3G, 4G and 4G Long Term Evolution (LTE) wireless technologies, radio and television broadcast technologies, HAM/amateur radios, micro-wave technologies. Further, "Licensed RF" refers to frequency allocations arising in the United States commonly in the 700 MHz, 1700-2100 MHz, 1900 MHz, and 2500-2700 MHz ranges. Other frequency allocations may be used in the U.S. and/or in other jurisdictions.

Herein, "Unlicensed RF" refers to communications systems, protocols, and technologies which use frequency allocations that do not require a license by a governmental authority, such as the United States Federal Communications Commission. Non-limiting examples of unlicensed RF uses include Wi-Fi, WiFi-6E, Citizens Band Radio Service (CBRS), Bluetooth, Zigbee, and others. Further, unlicensed RF also refers to frequency allocations arising in the United States in the 2.4 GHz, 3.5 GHz, 5 GHz, 5.9 GHz, 6 GHz and above 95 GHz bands. Other frequency allocations may be used in the U.S. and/or in other jurisdictions.

Figure 1:
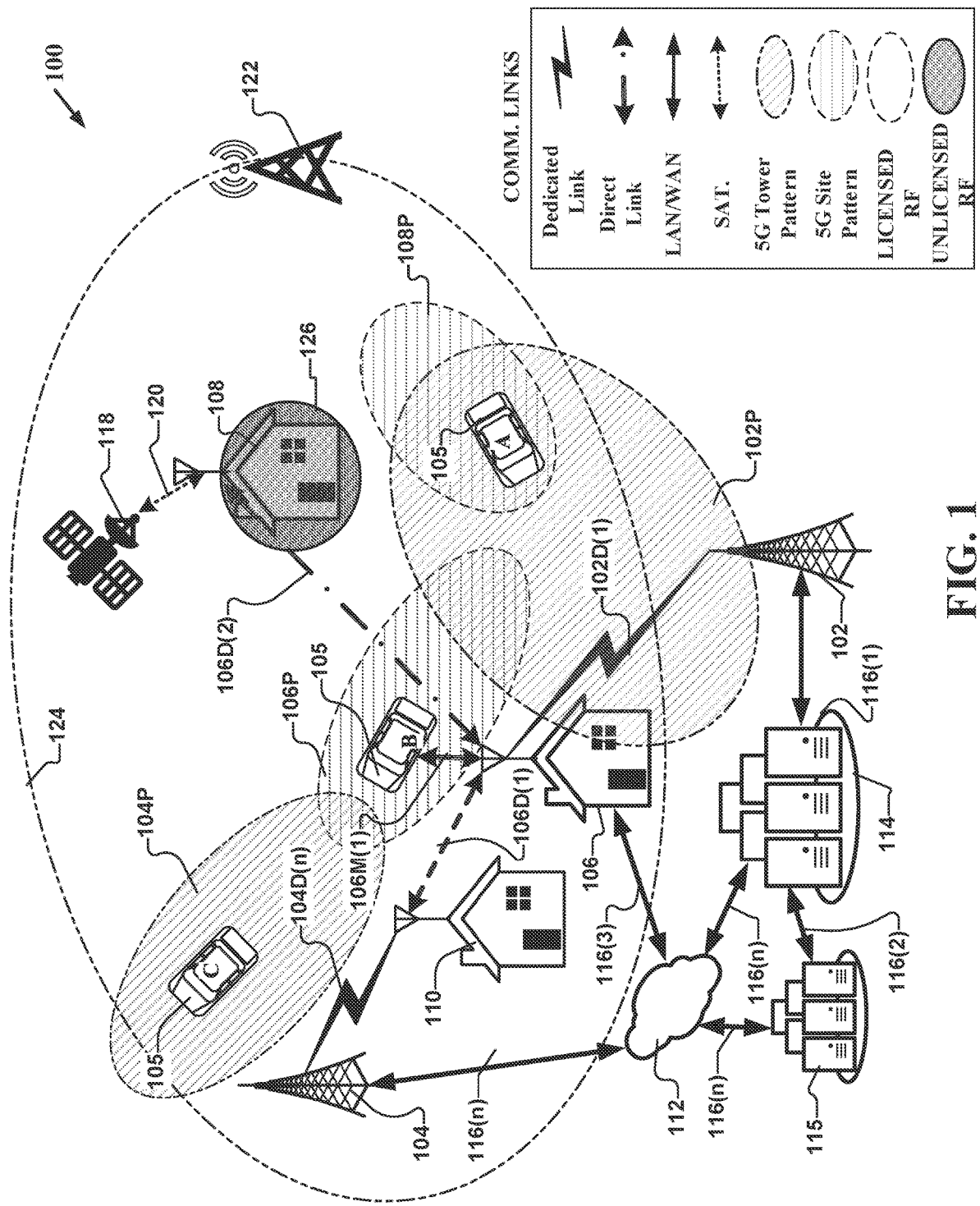
FIG. 1 is a schematic representation of an adaptive 5G system and in accordance with at least one implementation of the present disclosure.

As shown in FIG. 1, an adaptive 5G system 100 may include one or more adaptive 5G nodes. Various types of adaptive 5G nodes may be used in an adaptive 5G system 100 including, but not limited to, an adaptive 5G tower, an adaptive 5G site, and/or an adaptive mobile device. Unless expressly identified herein, an adaptive 5G tower, an adaptive 5G site, and an adaptive mobile device are commonly described with reference to a "adaptive 5G node."

Adaptive 5G Tower

An adaptive 5G system 100 may include one or more adaptive 5G towers, such as a first adaptive 5G tower 102 and an $n^{th}$ adaptive 5G tower 104. An adaptive 5G tower may be provided using any form of physical structure including, but not limited to, radio towers, antennas mounted on building roofs, sides, pools, street poles, balloons, aircraft, drones, or otherwise. An adaptive 5G tower may include any known and/or later arising cellular and/or mobile communications technologies, systems and components configured for use with 5G, licensed RF, and/or unlicensed RF. An adaptive 5G tower may include a 5G macro cell site and/or a 5G small cell site. An adaptive 5G tower is commonly operated by, and/or on behalf of, a 5G telecommunications service provider (herein, each an "adaptive 5G service provider"), such as AT&T, VERIZON, and T-MOBILE (in the U.S.), where access to the 5G service arises under a contractual relationship between the 5G service provider and another legal entity, such as a person, company, or other legal entity. Herein, such 5G systems are referred to as "private adaptive 5G systems."

An adaptive 5G system 100 may also include use, in whole or in part, of adaptive 5G towers that open to use by the public, herein, a "public adaptive 5G system." For a public adaptive 5G system, access to such system may be provided on a free, on-demand, or other basis, by a governmental entity or quasi-governmental entity, often for free, and otherwise. A non-limiting example of a public adaptive 5G system is an adaptive 5G system offered for use with any appropriately configured device in an airport, train or other mass transit operator. For at least one implementation, a public adaptive 5G system may be used in conjunction, in lieu of, or otherwise with one or more private adaptive 5G systems.

An adaptive 5G node may be configured to generate one or more 5G radio frequency signals (herein, each an "adaptive 5G signal"). An adaptive 5G signal may be provided using a "dedicated link" between an adaptive 5G tower and an adaptive 5G site, such as a first adaptive 5G site 106, a second adaptive 5G site 108, and an $n^{th}$ adaptive 5G site 110. Adaptive 5G sites are further described below. An adaptive 5G signal may be provides using a "mobile dedicated link" between an adaptive 5G tower 102/104 and an adaptive mobile device 105. Adaptive mobile devices are further described below.

As used herein a "dedicated link" occurs between an adaptive 5G tower and a second adaptive 5G node, where the location of the second adaptive 5G node is fixed and/or known in advance of the communications link being established with the adaptive 5G tower. In contrast, a "mobile dedicated link" occurs between an adaptive 5G tower and a second adaptive 5G node having a location that varies and/or may vary over time. For at least one implementation of a dedicated link, the position of the second adaptive 5G node may be known by the adaptive 5G tower before the link is established. For at least one implementation of a mobile dedicated link, the position of the second adaptive 5G node may not be known before a request to establish a mobile dedicated link is received by the given adaptive 5G tower from the second adaptive 5G node.

As used herein, an adaptive 5G signal may be defined in terms of one or more coverage areas. Herein, a "coverage area" refers to an area over which a 5G link, dedicated or otherwise, may be established between two adaptive 5G nodes for an adaptive 5G system 100. It is to be appreciated that a first adaptive 5G node, such as the first adaptive 5G tower 102, may have a first coverage area, a second adaptive 5G node, such as the first adaptive 5G site 106, may have a second coverage area, and a third adaptive 5G node, such as the adaptive mobile device 105, may have a third coverage area (for example, one that is intra-vehicle). Such coverage areas may overlap, in whole or in part, at any given time, and may cover distinct geographic areas, times, frequencies, modulation schemes utilized, or otherwise.

An adaptive 5G signal may be generated to provide communication link capabilities over a given coverage area by use of one or more 5G radio frequency signal patterns, such as an omni-directional or other coverage pattern. For example, the first adaptive 5G tower 102 may generate a first adaptive 5G tower pattern 102P, while the $n^{th}$ adaptive 5G tower 104 generates an $n^{th}$ adaptive 5G tower pattern 104P. Herein, each pattern generated by an adaptive 5G tower is identified as an "adaptive 5G tower pattern"). An adaptive 5G tower may be configured to generate one or more adaptive 5G tower patterns and an adaptive 5G system 100 may use multiple adaptive 5G tower patterns to facilitate dedicated links and/or mobile dedicated links within one or more coverage areas. Similarly, an adaptive 5G site may offer an adaptive 5G site pattern, such as a first adaptive 5G site pattern 102P and a second adaptive 5G site pattern 108P. An adaptive mobile device may offer a mobile pattern (not shown) within which 5G services may be accessible.

Herein, an "operations area" refers to an ability of an adaptive 5G system 100 element, such as an adaptive 5G tower, an adaptive 5G site, and/or an adaptive mobile device, to provide separately or in combination, one or more "adaptive data operations" (as further defined), in view of one or more "system criteria" (as further defined). An operations area may overlap in whole or in part, permanently, temporarily, periodically, or otherwise with a given coverage area.

Herein, "adaptive data operations" include, but are not limited to, operations involving communications, data processing, data storage, content aggregating, content streaming, and the like. For at least one implementation, "adaptive data operations" are non-mental operations specifically configured for use in an adaptive 5G system and that are performed on data with non-limiting examples including motion vector signal processing, the editing of motion videos, complex mathematical operations, artificial intelligence operations, computer-based diagnostic medicine operations, financial trades, and otherwise.

Herein, "adaptive data processing resources" include any electrical, electronic and/or computer-based device(s) and/or system(s) which facilitate, in whole or in part, one or more adaptive data operations. Non-limiting examples of adaptive data processing resources include personal computers, servers, gaming consoles, mobile phone processors and related components, tablet computing devices, laptop computers, and others configured for use in an adaptive 5G system. Any known or later arising adaptive data processing resources configured to perform one or more adaptive data operations may be managed by the data processing engine 210.

Herein, "common resources" include any electrical, electronic and/or computer-based device(s) and/or system(s) which facilitate, in whole or in part, one or more "common data operations" (as defined below). Non-limiting examples of common resources include personal computers, servers, gaming consoles, mobile phone processors and related components, tablet computing devices, laptop computers, and others configured using currently available technologies. Non-limiting examples of common resources includes an Internet Service Provider ("ISP"), such as in the United States include CENTURYLINK, COX COMMUNICATIONS, XFINITY, VERIZON, AT&T, and others. Other ISPs exist in other jurisdictions. ISPs commonly provide access to web sites and application service providers (herein, collectively "ASPs"). Non-limiting examples of ASPs, in the United States, include video streaming providers such as NETFLIX, SLING TV, and others, online banking providers such as WELLS FARGO, USBANK, and others, content hosting sites such as DROPBOX, search sites such as GOOGLE, and otherwise. An ASP may be configured to facilitate one or more adaptive data operations.

Herein, "common data operations" are non-mental operations that are not specifically adapted for use in an adaptive 5G system. Non-limiting examples including commonly available today motion vector signal processing, the editing of motion videos, complex mathematical operations, artificial intelligence operations, computer-based diagnostic medicine operations, financial trades, and otherwise.

Herein, "system criteria" include one or more factors that influence the providing of one or more adaptive data operations within a given coverage area and as further defined, if so defined, within one or more operations areas. Such factors may include, but are not limited to, geography, frequency band(s) uses, signal characteristics, presence/absence of signal interferences, temporal considerations, latency, computer processing times, data rates, data types, types of data processing, and the like.

For at least one implementation, an adaptive 5G system 100 may be used to establish dedicated links and mobile dedicated links between one or more adaptive 5G tower and one or more adaptive 5G nodes, such as the adaptive mobile device 105 and/or the first adaptive 5G site 106, and within a given coverage area and furthering the providing of at least one operations area. As used herein, adaptive 5G sites and adaptive mobile devices are each operated by a "user." As described above, adaptive 5G towers are operated by an adaptive 5G service provider.

Operations provided in a first operations area may include the same, more or less operations than are provided in a second operations area. A system criteria for a given operations area may differ from those applicable to another operations area. Coverage areas, operations areas, and system criteria may vary over time, place, and any other consideration.

An adaptive 5G tower 102/104 may be configured for use with directional antennas, directional beams, or the like to establish dedicated links between the adaptive 5G tower 102/104 and with one or more adaptive 5G sites 106/108/110 and/or to establish mobile dedicated links with adaptive mobile devices 105. For example, a first dedicated link 102D(1) may communicatively couple the first adaptive 5G tower 102 with a first adaptive 5G site 106, while an $n^{th}$ dedicated link 104D(n) may be used to communicatively couple the $n^{th}$ adaptive 5G tower 104 with an $n^{th}$ adaptive 5G site 110. A dedicated link may include use of any of one or more 5G technologies. For at least one implementation, a dedicated link may include use of a mmWave 5G communications link. Dedicated links may use one or more 5G bands including High-bands, Mid-bands and Low bands.

Adaptive 5G tower patterns 102P/104P may be used in an adaptive 5G system 100 to provide adaptive 5G coverage areas within which communications capabilities between an adaptive 5G tower 102/104 and one or more of an adaptive 5G site 106/108/110 and/or an adaptive mobile device 105 can be established. Such 5G communications capabilities may include, for example, use of mmWave 5G link, and use of one or more of 5G High-bands, Mid-bands and Low bands. Beamforming, adaptive antenna systems (in one or more of an adaptive 5G tower 102/104, an adaptive mobile device 105, and/or an adaptive 5G site 106/1081/110), and other known or later arising 5G communications technologies may be used in conjunction with dedicated links and mobile dedicated links.

Adaptive Mobile Devices

As shown in FIG. 1 for purposes of illustration, an adaptive mobile device 105 may arise at a given time at one or more locations, such as locations A, B, or C. Any device that is 5G compatible with a given adaptive 5G system may be used as an adaptive mobile device 105. Non-limiting examples of an adaptive mobile device 105 include in-vehicle communications and/or entertainment systems, mobile phones, augmented reality glasses, drones, smart devices (such as smart watches), and otherwise.

Any device configured with an adaptive 5G transceiver may be used as an adaptive mobile device 105. An adaptive mobile device 105 may include use of location, direction and movement determination technologies, such as the Global Positioning System (GPS), time-based signal measurements based on triangulations and/or vectorization, or otherwise. An adaptive mobile device 105 may provide a mobile pattern (not shown) which provides other adaptive 5G nodes and/or other devices in or near the mobile device access to adaptive data operations. An adaptive mobile device 105 may be configured to operate as a 5G macro cell, small cell and/or femtocell. A non-limiting example of a femtocell is a BLUETOOTH transceiver in an adaptive mobile device (such as a vehicle entertainment system) which enables conventional (e.g., non-adaptive 5G) wireless headphones, associated with a given user, to receive streaming audible signals transmitted over the adaptive 5G system 100.

Adaptive 5G Sites

As further shown in FIG. 1, an adaptive 5G system 100 may include use of one or more adaptive 5G sites, such as a first adaptive 5G site 106, a second adaptive 5G site 108 and an $n^{th}$ adaptive 5G site 110. An adaptive 5G site 106/108/110 may include use of a macro cell, small cell, femtocell, and/or unlicensed site configured to send and receive adaptive 5G signals to and from an adaptive 5G tower 102/104, another adaptive 5G site 106/108/110 and/or an adaptive mobile device 105.

For at least one implementation, an adaptive 5G site 106/108/110 may be configured to operate as a relay for adaptive 5G signals originating from an adaptive 5G tower 102/104 and destined for another adaptive 5G site, an adaptive mobile device 105, and/or another adaptive 5G node. For example, the first adaptive 5G site 106 may relay adaptive 5G signals from the first adaptive 5G tower 102 destined for the second adaptive 5G site 108—the second adaptive 5G site 108 being outside a coverage area of the first adaptive 5G tower 102. Similarly, the first adaptive 5G site 106 may operate as a relay between the adaptive mobile device 105, when for example at location B, and one or more of the first adaptive 5G tower 102 and/or the $n^{th}$ adaptive 5G tower 104. Similarly, the first adaptive 5G site 106 and $n^{th}$ adaptive 5G site 110 may be configured to operate as multi-hop relays between the first adaptive 5G tower 102 and the $n^{th}$ adaptive 5G tower 104.

For at least one implementation, an adaptive 5G site 106/108/110 may be used to extend the coverage area of adaptive 5G signals communicated between adaptive 5G towers, other adaptive 5G sites, adaptive mobile devices, and otherwise. Any network configuration may be formed used to extend the coverage area of an adaptive 5G system by use of one or more, adaptive 5G towers, adaptive 5G sites, and/or adaptive mobile devices, including but not limited to, daisy chain, ring, star, tree, bus, mesh, line, fully connected, other topologies, and/or combinations of the foregoing. For at least one implementation, two or more adaptive 5G sites may be used to form a mesh network that includes adaptive 5G towers, adaptive mobile devices, adaptive 5G sites, and other communications, networking, data processing, content providing and otherwise devices and systems.

An adaptive 5G site, such as the first adaptive 5G site 106, may be configured to generate a "adaptive 5G site pattern" such as a first adaptive 5G site pattern 106P. A second adaptive 5G site 108 may be configured to generate a second adaptive 5G site pattern 108P. An adaptive 5G site pattern 106P/108P may be generated and use communications technologies that are the same as and/or different than the communication technologies utilized by an adaptive 5G tower to generate an adaptive 5G tower pattern. For a non-limiting example, a second adaptive 5G site pattern 108P may use of mid-band and low band frequencies, while a first adaptive 5G site pattern 106P may use high band, mid-band and low band frequencies. Further, a given adaptive 5G site 106/108/110 may be configured to use, or not use, one or more communications technologies such as beamforming, beam steering, and otherwise.

For at least one implementation, an adaptive 5G site 106/108/110 may be configured to use communications technologies that utilize less electrical energy, lower frequencies, or otherwise than is used by an adaptive 5G tower. An adaptive 5G site may be configured to cover a given coverage area with a given adaptive 5G site pattern. Such coverage area may be separate from and/or overlap, in whole or in part, with a coverage area covered by a given adaptive 5G tower. As shown, for example and not by limitation, the first adaptive 5G site 106 may generate a first adaptive 5G site pattern 106P that includes a coverage area that overlaps, in whole or in part, with the first adaptive 5G tower pattern 102P and the $n^{th}$ adaptive 5G tower pattern 104P. An adaptive 5G site may be configured to provide an "operations area" within an entirety of or a portion of a given adaptive 5G site pattern. An operations area may vary based upon 5G system elements seeking to use one or more operations provided within a given operations area, time, or otherwise.

The first adaptive 5G site pattern 106P may be generated to cover one or more gaps that may occur between coverage areas of adaptive 5G tower pattern(s). Such coverage area gap may arise permanently, temporarily, or otherwise. For example, the location of the adaptive mobile device 105 at location B may result, at a given time, in an unavailability of a coverage area between the adaptive mobile device 105 and the first adaptive 5G tower 102 that is otherwise available when the adaptive mobile device 105 was at location A. Such unavailability in coverage area may arise due to various considerations, non-limiting examples including geography, signal interference, network congestion, distance, mobile device capabilities, or otherwise. The first adaptive 5G site 106 may be configured to provide a first adaptive 5G site pattern 106P providing a coverage area that address the otherwise occurring coverage gap so that a desired quality of service may be provided between the adaptive mobile device 105 and the 5G service provider, throughout a coverage area that extends beyond a more limited coverage area provided by the 5G service provider using the first adaptive 5G tower 102 and/or the $n^{th}$ adaptive 5G tower 104.

As further shown in FIG. 1, a given adaptive 5G site may be configured to provide communications links between one or more adaptive 5G towers and one or more second adaptive 5G sites. Herein, communications links between two or more adaptive 5G sites are referred to as each being a "direct link." As shown, a first direct link 106D(1) may be established between the first adaptive 5G site 106 and the $n^{th}$ adaptive 5G site 110. A second direct link 106D(2) may be established between the first adaptive 5G site 106 and the second adaptive 5G site 108. A direct link may utilize any desired 5G communications technologies and may use one or more of the High-bands, Mid-bands and Low bands. A direct link may use other, non-5G communications technologies.

As further shown in FIG. 1, a given adaptive 5G site may be configured to provide communications links with an adaptive mobile device. Herein, communications links between an adaptive 5G site and an adaptive mobile device are referred to as each being a "mobile direct link." As shown, a first mobile direct link 106M(1) may be established between the first adaptive 5G site 106 and the adaptive mobile device 105. A mobile direct link may utilize any desired 5G communications technologies and may use one or more of the High-bands, Mid-bands and Low bands. A mobile direct link may use other, non-5G communications technologies.

For at least one implementation, one or more adaptive data operations facilitated by adaptive 5G sites may be the same or different. As shown a first adaptive 5G site 106 may be coupled to the $n^{th}$ adaptive 5G tower 104 using the second direct link 106D(2) and a $n^{th}$ dedicated link 104D(n) between the $n^{th}$ adaptive 5G tower 104 and the $n^{th}$ adaptive 5G site 110. For example, an $n^{th}$ adaptive 5G site 110 may be configured to provide data relaying capabilities while the second adaptive 5G site 108 may be configured to receive, process, and forward content provided by satellite 118, for example, a direct broadcast satellite system (DBS) satellite, over a satellite link 120 or otherwise.

The adaptive 5G system 100 may also include use of one or more wide area networks ("WAN") 112. A non-limiting example of a WAN is the Internet. The WAN 112 may be communicatively coupled by network links 116(1)-(n) to one or more adaptive 5G towers 102/104 and/or adaptive 5G sites, such as first adaptive 5G site 106. A network link 116 may use any desired communications technologies including wired and wireless technologies. It is to be appreciated that a WAN 112 may be facilitated using any desired networking technologies including, but not limited to, dial-up, digital subscriber link (DSL), cable modem, fiber-optic, and otherwise. A WAN 112 and network link 116 may be used to extend the coverage area of a given adaptive 5G site and thereby the coverage area of an adaptive 5G system 100.

For example, a first network link 116(1) may be used to communicatively couple the first adaptive 5G tower 102 with a server core 114. The server core 114 may be provided by an adaptive 5G service provider to facilitate the providing of adaptive 5G services and/or other adaptive data operations. A second network link 116(2) may be used to communicatively couple the server core 114 with a common resource 115. A third network link 116(3) may be used to communicatively couple the first adaptive 5G site 106 with the WAN 112. An $n^{th}$ network link 116(n) may be used to communicatively couple the $n^{th}$ adaptive 5G tower 104 to the WAN 112, the common resource(s) 115 to the WAN 112, the server core 114 to the WAN, and otherwise. Any number of adaptive 5G nodes, common resources. and the like may be directly or indirectly coupled by one or more network links 116 to the WAN 112. It is to be appreciated that use of a WAN 112 may expand the range of available data operations accessible via the adaptive 5G system 100 to practically any data operations permitted by law, regulation, 5G service provider, adaptive 5G node, a given common resource, or otherwise.

License RF Node

The adaptive 5G system 100 may include use of Licensed RF spectrum as facilitated, for example, by communicative coupling an adaptive 5G node with a licensed RF node 122. A licensed RF node 122 may facilitate a licensed RF pattern 124 in which licensed RF signals may be used for communication. A licensed RF pattern 124 may have a larger coverage area than is provided by, for example, the first adaptive 5G tower pattern 102P or the first adaptive 5G site pattern 106P. The licensed RF node 122 may be collocated with and/or separate from an adaptive 5G tower. An expanded coverage area may arise from use of the licensed RF node 122 due to frequencies used, resources provided, tower heights used, data constraints, and other factors. For at least one implementation, the adaptive 5G system 100 may be configured to utilize the licensed RF node 122 to facilitate the providing of non-adaptive data operations, and without using adaptive 5G tower resources, one non-limiting example being text messaging. The adaptive 5G system 100 may also be configured to utilized resources provided by the licensed RF node 122 to cover gaps in a coverage area that would otherwise occur, absent use of the licensed RF node 122 resources.

Unlicensed RF

The adaptive 5G system 100 may include use of unlicensed RF spectrum. For example, the second adaptive 5G site 108 may be configured to include a router capable of forming a wireless local area network (a "WLAN"), for example using Wi-Fi™ that provides an unlicensed RF pattern 126 for use by compatible devices within the signal range of the router. As is commonly appreciated, Wi-Fi and other unlicensed RF signals are often limited to signal ranges of less than 50 meters, without use of extenders. The unlicensed RF pattern 126 may be used to connect devices within an adaptive 5G node. For example, a Wi-Fi capable mobile phone may connect the second adaptive 5G site 108 and then use a dedicated link or a direct link to connect with one or more other 5G nodes.

Adaptive 5G Node

Figure 2:
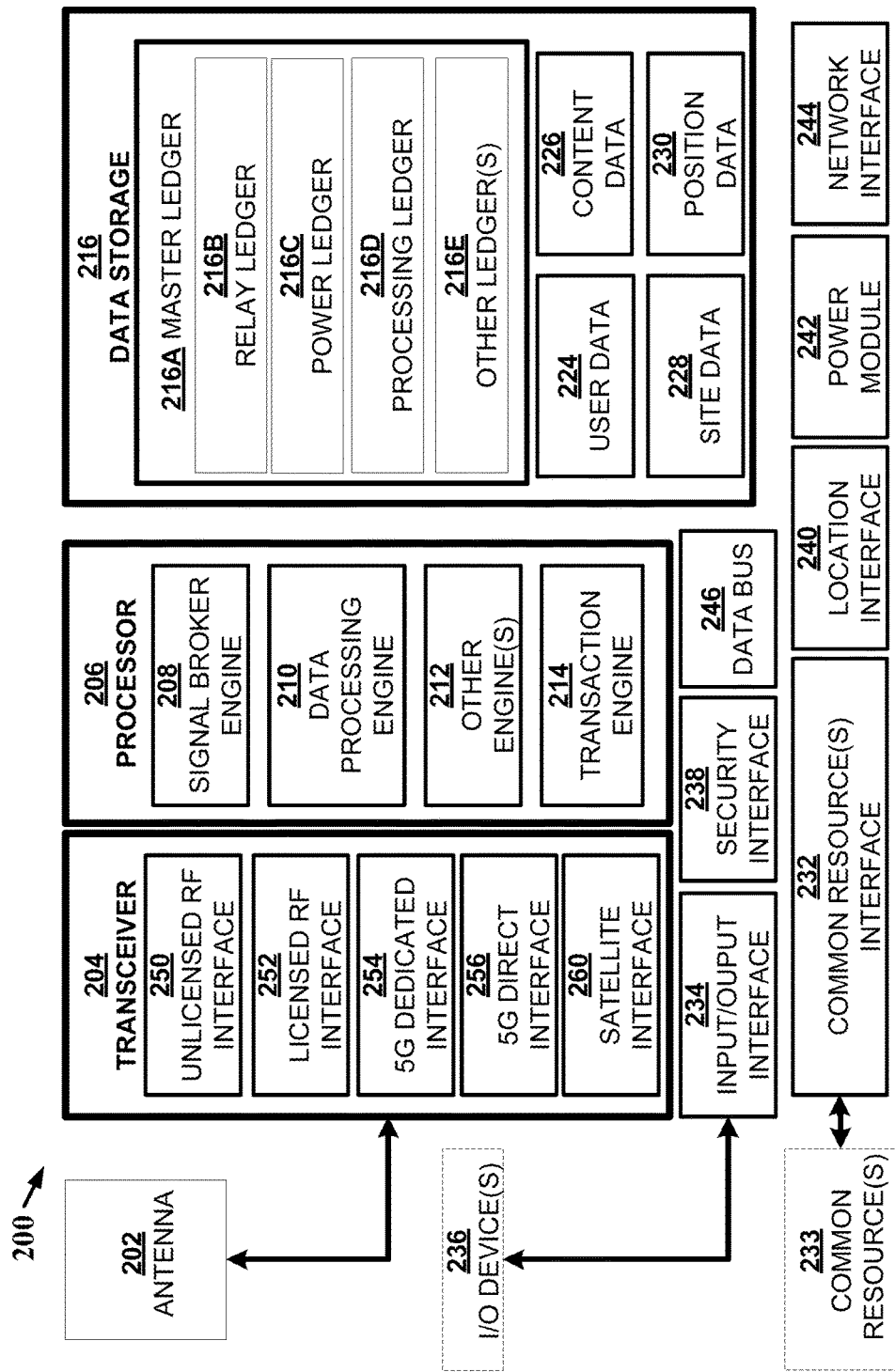
FIG. 2 is a schematic representation of private adaptive 5G node configured for use in an adaptive 5G system and in accordance with at least one implementation of the present disclosure.

As shown in FIG. 2, at least one implementation of the present disclosure may include an adaptive 5G node 200. The adaptive 5G node 200 may be provided as an adaptive 5G tower, an adaptive 5G site, an adaptive mobile device, or otherwise. The adaptive 5G node 200 may include an antenna 202, a transceiver 204, a processor 206, and a data storage device 216. Various other optional devices may be provided, for a given implementation at a given adaptive 5G node 200, non-limiting examples include a common resource(s) interface 232 that couples an adaptive 5G node 200 with one or more common resource(s) 233, an input/output interface 234 coupling the adaptive 5G node 200 with input/output devices 236, a security interface 238, a location interface 240, a power interface 242, and network interface 244. Other interfaces may be used for a given implementation to couple an adaptive 5G node 200 with other devices and/or systems. The various elements of an adaptive 5G node 200 may be communicatively coupled, using any known or later arising technologies including, for example, a data bus 246, over a LAN, a WLAN, using an Ethernet connection, or otherwise.

Antenna 202

The antenna 202 may include use of one or more RF signaling technologies compatible with transmission and reception of adaptive 5G signals in one or more of the High bands, mid-bands and low bands. The antenna 202 may be configured to send and receive adaptive 5G signals including, but not limited to, mmWave 5G signals using one or more dedicated links with adaptive 5G towers and/or one or more direct links with another adaptive 5G site and/or an adaptive mobile device. The antenna 202 may be configured to utilize beamforming, beam-steering, MIMO and other antenna technologies to send and receive adaptive 5G signals over dedicated (mobile) links and/or direct (mobile) links. For at least one implementation, the antenna 202 may be configured to use both dedicated links and direct links. For implementations where an antenna 202 is configured for use as a relay between two or more adaptive 5G nodes, the antenna 202 may be configured to send and receive adaptive 5G signals over direct links while not being configured to send and receive adaptive 5G signals over dedicated links. Similarly, a given antenna 202 may or may not be configured to support use of mobile direct links.

The antenna 202 may be configured to send and receive non-adaptive 5G signals using Licensed RF frequencies and/or Unlicensed RF frequencies. When so configured, the antenna 202 may be configured for use with any known or later arising technologies facilitating use of Licensed RF frequencies and/or Unlicensed RF frequencies.

The antenna 202 may be configured to send and/or receive signals using satellite links. Non-limiting examples of satellite signals include DBS signals, GPS signals, satellite communications signals, and otherwise.

The antenna 202 may be configured to use any known or later arising antenna technologies compatible with the adaptive 5G, Licensed RF, Unlicensed RF, and/or satellite frequencies and signal characteristics used to communicate data by and between one or more adaptive 5G nodes. Non-limiting examples of antenna types include wire antennas, log periodic antennas, aperture antennas, microstrip antennas, reflector antennas, lens antennas, traveling-wave antennas, and array antennas.

Transceiver 204

An adaptive 5G node 200 may include one or more transceivers 204. The transceiver 204 may be coupled to the antenna 202 and configured to provide signal processing technologies for RF signals sent and received by the adaptive 5G node 200. Non-limiting examples of signal processing technologies include amplifiers, mixers, filters, error checking circuits, delay circuits, encoders, decoders, encryption, decryption, modulation, demodulation, scrambling, descrambling, frequency shifting, signal spreading, multiplexing, waveform synthesis, and any known and/or later arising RF signal processing technologies and combinations and permutations thereof.

The transceiver 204 may be configured to support one or more signal multiple access schemes including, but not limited to, orthogonal and non-orthogonal multiple access schemes, such as Code Division Multiple Access (CDMA), Frequency Division Multiple Access (FDMA), Time Division Multiple Access (TDMA), FDMA+TDMA, OFDM, OFDMA, CP-OFDM, WOLA/OFDMA, and SC-FDMA, RSMA, Sparse Code Multiple Access (SCMA), Multi-User Shared Access (MUSA), and others.

The transceiver 204 may include one or more interfaces configured to provide the signal processing technologies utilized in conjunction with adaptive 5G signals and, if any, one or more Licensed RF, Unlicensed RF, Satellite, and other signals.

The transceiver 204 may include at least one of a 5G dedicated interface 254 and a 5G direct interface 256. The 5G dedicated interface 254 may be used to facilitate communication of adaptive 5G signals with an adaptive 5G tower using a dedicated link and/or a mobile dedicated link. The 5G direct interface 256 may be used to facilitate communication of adaptive 5G signals with an adaptive 5G site using a direct link and/or with an adaptive mobile device using a mobile direct link.

The transceiver 204 may optionally include one or more of an Unlicensed RF interface 250, a licensed RF interface 252, and a satellite interface 260. Such interfaces may be used to provide known and/or later arising technologies used to send and/or receive signals using Unlicensed RF signals, Licensed RF signals and/or satellite signals.

It is to be appreciated that the signal processing technologies provided by the transceiver 204 may be accomplished using hardware specific and/or hardware-software configured devices including, but not limited to, application specific integrated circuits (ASICs), digital signal processors (DSPs), controllers (micro or otherwise), general purpose processors such as multi-bit central processing units, multi-core ARM based processors, or otherwise. Signal processing technologies may be facilitated by use of dedicated hardware circuits, software executed on hardware processors, software defined radios, and otherwise.

Processor 206

An adaptive 5G node 200 may include a processor 206. The processor 206 may be any single or combination of processing devices including, but not limited to, a general-purpose processor, a special purpose processor, a digital signal processor (DSP), a controller (micro or otherwise), an application specific integrated circuit (ASIC), or any other integrated circuit or combinations thereof. For at least one embodiment, the processor 206 may include one or more hardware processors, such as 32-bit and 64-bit central processing units, multi-core ARM based processors, microprocessors, microcontrollers, and otherwise. The data processing operations executed by the processor 206 may include one or more non-transient computer executable instructions. The non-transient computer executable instructions may include instructions for executing one or more applications, engines, and/or processes configured to perform computer executable operations (hereafter, "computer instructions"). The hardware and software technologies provided by the processor 206 and the computer instructions may arise in any desired computing configuration including, but not limited to, local, remote, distributed, blade, virtual, or other configurations and/or systems configured for use in support of the one or more embodiments of the present disclosure.

The computer instructions may be suitable stored or otherwise provided to the processor 206 for execution thereby as desired for any given embodiment. Such computer instructions may be executed by the processor 206 in support of any function of an adaptive 5G node 200. The processor 206 may be configured to execute computer instructions written in any desired programming language including, but not limited to, PERL, C, C+, C++, or otherwise. Such computer instructions may be assembled, compiled, interpreted, or otherwise processed into one or more machine code instructions available for execution by the hardware provided by the processor 206 or other elements of an adaptive 5G node 200.

The computer instructions may be stored and/or provided in a data storage device 216 provided with the processor 206 itself, such as in cache or read only memory, as firmware, accessible from a remote source, in the data storage device 216, or otherwise. The processor 206 may be separated into one or more logical processing elements that execute computer instructions to facilitate the various features and functions of an adaptive 5G node 200, as so configured in accordance with one or more implementations of the present disclosure. Non-limiting examples of such features and functions supported by the processor 206 may include data processing, communications circuit control, signal processing, security, adaptive 5G site maintenance, positioning determination, power control and monitoring, network interfacing, record-keeping including blockchain ledger accounting, user input and output operations, and any other function or feature provided, supported, and/or executed by an adaptive 5G node 200.

It is to be appreciated that one or more adaptive 5G nodes 200 may include legacy devices and/or systems that have been configured to execute the computer instructions via one or more downloads, device/system updates, installs, add-on hardware or software interfaces or otherwise. It is also to be appreciated that an adaptive 5G node 200 component may also and/or alternatively be new devices specifically configured to facilitate use, transmission, reception, signal processing and other operations regarding adaptive 5G signals and other signal types, data processing, and other operations.

An implementation of the present disclosure may be accomplished using known or existing devices and systems that have been configured, in accordance with at least one embodiment described herein, to execute computer instructions supporting one or more of the operations described herein and any other desired signal processing, data processing, data storage, and other operations.

The processor 206 may be configured to execute computer instructions which facilitate one or more data processing operations (herein, each an "engine") including, but not limited to, a signal broker engine 208, a data processing engine 210, an "other" engine 212, and transaction engine 214.

Signal Broker Engine 208

An adaptive 5G node 200 may include a signal broker engine 208 configured to manage, allocate, account, and otherwise attend to the communications related operations provided by the adaptive 5G node 200. For a non-limiting example, an adaptive 5G node 200, such as the first adaptive 5G site 106, may be configured to support communication operations that use, at any given time, communications resources available at the adaptive 5G site including, but not limited to one or more dedicated links, direct links, mobile direct links, adaptive 5G site patterns, Licensed RF signals, Unlicensed RF signals, LANs, WANs, and otherwise (herein collectively, "communications resources"). Available communications resources may vary over time, condition, in view of adaptive 5G node 200 settings, and otherwise. For example, an adaptive 5G site may be configured for use as a mesh node or otherwise, in the adaptive 5G system 100, during certain operating hours.

The signal broker engine 208 may be configured to determine which communications resources are available at the adaptive 5G node 200. The signal broker engine 208 may be configured to manage use of a given, then available communication resource in accordance with one or more rules, terms or conditions (herein, "technical conditions"). Non-limiting examples of technical conditions include signal characteristics such as transmission power, waveform and modulation scheme.

Data Processing Engine 210

An adaptive 5G node 200 may include a data processing engine 210 configured to manage, allocate, account, and otherwise attend to (herein, "manage") one or more "adaptive data processing resources" and/or "common resources" (as defined above) provided by and/or use by an adaptive 5G node 200. For a non-limiting example, an adaptive 5G node 200 may be configured to manage adaptive data operations that use, at any given time, local, LAN based, WAN based and/or other adaptive data processing resources accessible by the adaptive 5G site.

Adaptive data operations and adaptive data processing resources may be provided by an adaptive 5G node 200 in whole or in part, and on a localized and/or on a distributed basis including the allocation of adaptive data operations on time, packet sized, or other bases across two or more adaptive data processing resources. Adaptive data operations provided by an adaptive 5G node 200 and managed by a data processing engine 210 may include adaptive data operations performed by one or more adaptive data processing resources provided by the adaptive 5G node 200 itself, such as processor 206, and/or provided by other remote data processing resources. A common resource(s) interface 232 may be included in an adaptive 5G node 200 to facilitate coupling of the adaptive 5G node 200 with one or more remote data processing resources. The data processing engine 210 may be configured to manage use of remote data processing resources by the adaptive 5G node 200.

"Other" Engine(s) 212

An adaptive 5G node 200 may include "other" engines configured to manage other forms of adaptive data operations with a non-limiting example being a streaming content engine. Any "other" engine 212 may be used.

Transaction Engine 214

An adaptive 5G node 200 may include a transaction engine 214 configured to operate in conjunction with one or more of the signal broker engine 208, the data processing engine 210, and other engine(s) 212, to participate in bidding, rationing, auctioning, other allocations, and/or accounting for uses of communications resources, adaptive data processing resources, and/or other resources, as provided by a given adaptive 5G node for use by itself or another adaptive 5G node. For example, the first adaptive 5G site 106 may utilize a transaction engine 214, alone or in conjunction with a signal broker engine 208, to facilitate in bidding, auctioning, and like of the first adaptive 5G site's communications resources to support pass-through/relay data communication operations requested between the first adaptive 5G tower 102 and the second adaptive 5G site 108, and/or the $n^{th}$ adaptive 5G site 110.

Similarly, the first adaptive 5G site 106 may utilize a transaction engine 214 in conjunction with a signal broker engine 208 to account for use of one or more of the first adaptive 5G site's communications resources by the adaptive mobile device 105 while it travels through or is located within the first adaptive 5G site pattern 106P. Similarly, a first adaptive 5G tower 102 may utilize a transaction engine 214, alone or in conjunction with a data processing engine 210, to account for use of adaptive data processing resources provided by a given adaptive 5G site, such as the first adaptive 5G site 106, for use by another adaptive 5G site, such as the second adaptive 5G site 108, and/or by the adaptive mobile device 105. Similarly, an adaptive 5G node 200 may utilize a transaction engine 214 to account for power uses of the adaptive 5G node 200 in support of the adaptive 5G system 100, as may be determined, for example, by a power interface 242 (described further below).

Figure 3:
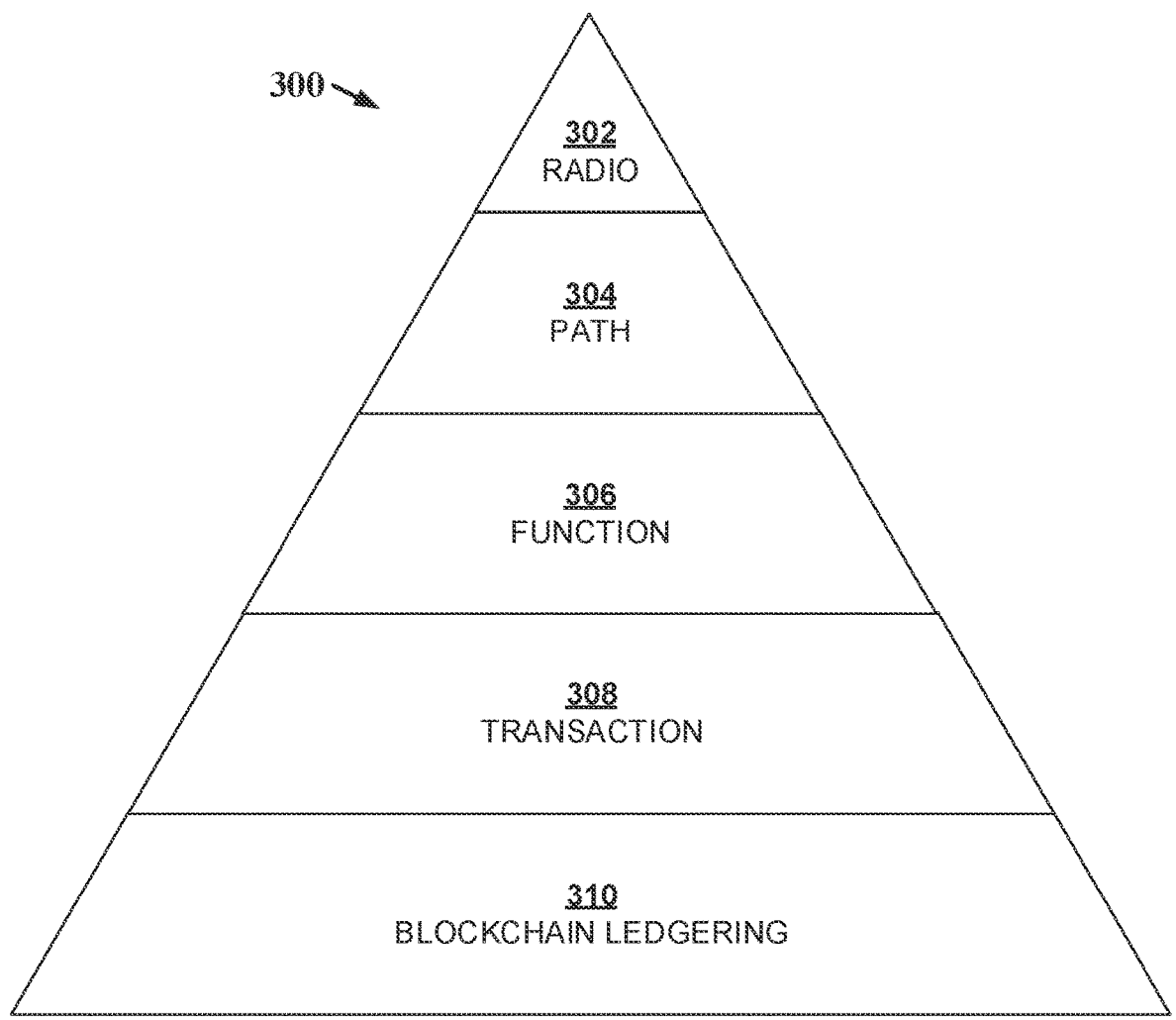
FIG. 3 is a schematic representation of a hierarchical model used for an adaptive 5G system and in accordance with at least one implementation of the present disclosure.

For at least one implementation, the transaction engine 214 may be configured to account for adaptive data processing resource utilizations by a given adaptive 5G node by use of one or more blockchain ledgers. One or more blockchain ledgers may be used in any desired relationship, hierarchical model, or otherwise. One example of such a blockchain hierarchical model is an adaptive 5G model, as shown in FIG. 3 and as further described below.

Data Storage Device 216

An adaptive 5G node 200 may include a data storage device 216. The data storage device 216 may include any desired use and/or combination of volatile and non-volatile storage technologies presently known and/or later arising. Non-limiting examples of such storage technologies include read only memory (ROM), random access memory (RAM), cache memory, magnetic storage devices, optical storage devices, flash memory devices, and others. The data storage device 216 is communicatively coupled to the processor 206.

The data storage device 216 may be configured to store one or more data sets, such data sets may include one or more computer instructions. Such data sets may be generated based upon actual use of a given adaptive 5G node's adaptive data processing resources, such as actual use of the transceiver 204 or of the processor 206 in a given adaptive 5G node 200. Such data sets may be provided during an initial set-up and/or initial use of a given adaptive 5G node 200, may be generated during registration, activation, use or other operations regarding an adaptive 5G node 200, or otherwise. The data storage device 216 may have any form known in the art or later arising removable or non-removable storage component. Non-limiting examples of storage components that may be used herewith include random-access memory, read-only memory, flash memory, memory sticks, secure digital memory cards, compact flash memory cards, subscriber identity module (SIM) cards, electronic SIM cards (also referred to as eSim cards), and others. One or more data storage devices may be provided with, local to, or remote from the data storage device 216.

The data storage device 216 may be a single storage device, multiple storage devices, or otherwise. The data storage device 216 may be provided locally with the adaptive 5G node 200 or remotely, such as by a data storage service provided on the WAN, and/or otherwise. Storage of data, including, and not limited to, a master ledger 216A, relay ledger 216B, power ledger 216C, processing ledger 216D, and "other" ledger 216E may be stored by the data storage device 216 in a blockchain or similar format.

The data storage device 216 may include one or more databases storing one or more of user data, content data, site data, and position data. Such databases may be managed by a storage controller (not shown) or similar component. It is to be appreciated such a storage controller manages the storing of data and may be instantiated in one or more of the data storage device 216, on/with the processor 206, on the WAN, or otherwise. Any known or later arising storage technologies may be utilized in conjunction with an implementation of the present disclosure to facilitate the data storage device 216.

Available storage provided by the data storage device 216 may be partitioned or otherwise designated by the storage controller as providing for permanent storage and temporary storage. Non-transient data, computer instructions, or other the like may be suitably stored by the data storage device 216. As used herein, permanent storage is distinguished from temporary storage, with the latter providing a location for temporarily storing data, variables, or other instructions used for a then arising adaptive data operations. A non-limiting example of a temporary storage device is a memory component provided with and/or embedded onto the processor 206. Accordingly, it is to be appreciated that a reference herein to "temporary storage" is not to be interpreted as being a reference to transient storage of data. Permanent storage and/or temporary storage may be used to store either, if not both, transient and non-transient computer instructions, and other data.

Master Ledger 216A

The data storage device 216 may include a master ledger 216A. For at least one implementation, the master ledger 216A may be provided in a blockchain format. The master ledger 216A may include data sets that identify adaptive 5G nodes in the adaptive 5G system 100, rules for participation, allowances and restrictions of access to transactions to certain adaptive 556 node within the adaptive 5G system 100, and otherwise. The master ledger 216A may specify one or more governing principles and/or rules by which the adaptive 5G system 100 and/or a given adaptive 5G node operates. These governing principles may be provided, in a blockchain format, and as appropriate for a given role of an adaptive 5G node. The governing principles may also be used, and provided in a blockchain format, with regard to one or more common resources, which as described above may include, but are not limited to, ISPs, ASPs, and any other device, system, or service participating in a given adaptive 5G system. Changes to the master ledger 216A may be communicated to adaptive 5G nodes and common resources with respect to which the master ledger 216A has changed, as compared to an immediate previous version of the master ledger 216A.

Portions, if not all, of the master ledger 216A portions may be variously accessible by an adaptive 5G node and/or a common resource. Portions of the master ledger 216A may include identifications of adaptive 5G nodes and/or common resources, and other data sets. A given portion of the master ledger 216A accessible by a given adaptive 5G node or common resource may be more extensive and inclusive than those portions of the master ledger 216A accessible by another adaptive 5G node or common resource.

For example, an adaptive 5G tower may have access to master ledger portions that identify multiple adaptive 5G sites, adaptive mobile devices, and the like that are within a coverage area and/or operations area for the adaptive 5G tower. As adaptive mobile devices enter into such a localized area, the blockchain portions of the master ledger 216A associated with tracking locations of a given adaptive mobile device and/or connections between a given adaptive mobile device and adaptive 5G tower may be updated, as appropriate. Accordingly, the master ledger 216A, as accessible by a given adaptive 5G node and as stored by a given data storage device 216, may include a continually updated identification of adaptive 5G nodes and/or common resources with which the given adaptive 5G node has established, has unestablished (dropped), and/or may establish a dedicated link, a direct link, and/or a network link. The master ledger 216A may provide a continual updated, as viewed from the perspective of a given adaptive 5G node and/or common resource, of past, current and potential future adaptive 5G nodes and/or common resources in the given adaptive 5G system 100.

The master ledger 216A, when provided in a blockchain format, may be configured using cryptographic techniques to facilitate security of data on the master ledger 216A, selective access to such data, facilitate confidentiality of actual users participating (via a given adaptive 5G node and/or common resource) in the given adaptive 5G system and masking of such user identifies (as appropriate), while providing an indelible master ledger.

The master ledger 216A, when provided in a blockchain format, may provide for accurate, time-based, verified and immutable recording of transactions between two or adaptive 5G nodes. For at least one implementation, adaptive 5G nodes in a given adaptive 5G system may verify each transaction, to which they are permitted to access, is valid. Such verifications may occur automatically whenever a given adaptive 5G node is "active" on the given adaptive 5G system.

The master ledger 216A may be configured to continually identify which adaptive 5G nodes are "active" with transactions being entered into the master ledger 216A, and each instantiation thereof shared with permitted adaptive 5G nodes. Each active adaptive 5G node may update their own databases identifying relevant active and inactive adaptive 5G nodes at a given time. Each adaptive 5G node may have unique, limited permissions. A server core 114 associated with a given service provider may have broader, the same, or narrower permissions.

As discussed below, a security interface 238 may be used to facilitate the granting, modification, and rescission of one or more permissions by an adaptive 5G node to data provided by the master ledger 216A, other ledgers, and/or other databases.

Relay Ledger 216B

The data storage device 216 may include a relay ledger 216B. The relay ledger 216B may be a partition of a master ledger 216A or managed as a separate ledger. For at least one implementation, the relay ledger 216B may be maintained in a blockchain format.

The relay ledger 216B may be configured to track performance of adaptive data operations. Such adaptive data operations may occur by and on behalf of a given adaptive 5G node.

For a non-limiting example, when ledgering uses by an adaptive 5G node of one or more adaptive data operations associated with a given adaptive 5G system, the relay ledger 216B may identify communication data (e.g., bit rate, packet size and the like) and/or other information concerning data transferred between a first adaptive 5G node and one or more second adaptive 5G nodes. It is to be appreciated that a corresponding blockchain ledger may also be maintained by each adaptive 5G node, service provider, regulatory authorities, taxing authorities, and otherwise involved in, monitoring, or otherwise associated with a given adaptive data operation.

By another non-limiting example, the relay ledger 216B may identify uses of an adaptive 5G site as a relay between an adaptive 5G tower and a common resource, such as via a direct link and/or a mobile direct link (herein, a "relay connection"). For such an example, corresponding relay ledgers 216 may be maintained by the adaptive 5G tower, the adaptive 5G site facilitating the relay connection, and the other adaptive 5G nodes and/or common resource used in conjunction with the relay connection. It is to be appreciated that the identification of the user, and/or other information, of the adaptive 5G site facilitating the relay connection may be (non)accessible to one or more of the other adaptive 5G nodes and/or common resources use with the relay connection. For example, an adaptive mobile device user of a relay connection between the adaptive mobile device 105, the first adaptive 5G site 106 and the first adaptive 5G tower 102 may have access to portions of the relay ledger 216B that merely identify information necessary to facilitate use of the relay connection but do not otherwise identify the first adaptive 5G site 106, the terms under which the relay connection is provided, or otherwise.

The relay ledger 216B may identify one or more relay parameters associated with one or more adaptive data operations. A non-limiting example of such relay parameters may include total bits transferred during a relay connection, an aggregate of total bits transferred over multiple relay connections, and the like. Relay parameters may be stored in the relay ledger 216B and may be used by the 5G service provider and others for accounting and other purposes.

Power Ledger 216C

The data storage device 216 may include a power ledger 216C. The power ledger 216C may be a partition of a master ledger 216A or managed as a separate ledger. For at least one implementation, the power ledger 216C may be maintained in a blockchain format. The power ledger 216C may be configured to track use of electrical power by an adaptive 5G node with respect to one or more adaptive data operations. Such power uses may occur by and on behalf of a given adaptive 5G node itself, on behalf of another adaptive 5G node, and/or on behalf of a common resource.

The power ledger 216C may identify one or more power parameters associated with use of electrical power in performance of one or more adaptive data operations. A non-limiting example of such power parameters may include peak current, average current, amp hours, total watts, average watts, time of use, and others. Power parameters may be stored in the power ledger 216C and may be used by the 5G service provider and/or others for accounting and other purposes.

Processing Ledger 216D

The data storage device 216 may include a processing ledger 216D. The processing ledger 216D may be a partition of a master ledger 216A or managed as a separate ledger. For at least one implementation, the processing ledger 216D may be maintained in a blockchain format. The processing ledger 216D may be configured to track use of adaptive data processing resources provided by an adaptive 5G node and with respect to one or more adaptive data operations performed in whole or in part by the adaptive 5G node. Such data processing operations may occur by and on behalf of a given adaptive 5G node itself, and/or on behalf of another adaptive 5G node, and/or a common resource.

The processing ledger 216D may identify one or more processing parameters associated with use of adaptive data processing resources used for one or more adaptive data operations. A non-limiting example of such processing parameters may include cores and threads of a multi-core processor used, processing speeds, data storage operations performed, data storage bytes used, allocated, reserved, and others. Processing parameters may be stored in the processing ledger 216D and may be used by the 5G service provider and others for accounting adaptive data operations and other purposes.

Other Ledger(s) 216E

The data storage device 216 may include a one or more "other" ledgers 216E. The other ledger(s) 216E may be a partition of a master ledger 216A or managed as a separate ledger. For at least one implementation, the other ledger(s) 216E may be maintained in a blockchain format. The other ledger(s) 216E may be configured to track use of common resources provided by and/or used by an adaptive 5G node and/or a common resource and with respect to one or more common data operations. Such common resource use may occur by and on behalf of a given adaptive 5G node itself, another adaptive 5G node, a common resource, or otherwise.

The other ledger(s) 216E may identify one or more parameters associated with use of one or more common resources used in performing one or more common data operations. A non-limiting example of a common resource may include use of a satellite interface 260 to provide audio/video content provided by a DBS satellite to an adaptive 5G node that cannot otherwise receive a signal from the DBS satellite. Such common resource may be identified as one or more parameters that may be stored in the "other" ledger 216E and may be used by the 5G service provider and others for accounting and other purposes.

User Database 224

The data storage device 216 may include a user database 224. The user database 224 may be a partition of a master ledger 216A, a separate ledger, and/or a separate database. For at least one implementation, the user database 224 may be maintained in a blockchain format. The user database 224 may be configured to store and provide data regarding one or more users of an adaptive 5G node 200.

The user database 224 may identify one or more user parameters associated with use of the adaptive 5G node, common resources, and/or the 5G system by the given user(s). Non-limiting examples of such user parameters include demographic data, psychographic data, medical data, personal data, preferences of the user, and other data. The user database 224 may be used by one or more of the signal broker engine 208, the data processing engine 210, the other engines 212, and the transaction engine 214 in providing, using, accounting and otherwise attending to uses of adaptive data operations by an adaptive 5G node on an individual basis, in a relay site capacity, or otherwise.

For example, user profile data identifying a monitored person has being elderly and on heart medication may be used by the signal broker engine 208 to establish a priority connection with a telemedicine health provider, using the 5G system, when certain medical data is abnormal, such as when an elevated heart rate, an abnormal heart rate, or other conditions arises.

Content Database 226

For at least one implementation, the data storage device 216 may include a content database 226. The content database 226 may be a partition of a master ledger 216A, a separate ledger, and/or a separate database. For at least one implementation, the content database 226 may be maintained in a blockchain format. The content database 226 may be configured to store and provide data regarding one or more instanced of content, such as a movie, accessible to an adaptive 5G node 200.

The content database 226 may identify one or more content parameters associated with use the given adaptive 5G node 200. Non-limiting examples of such content parameters include title, production date, producer, actor(s), ratings, format, and the like. The content database 226 may be used by one or more of the signal broker engine 208, the data processing engine 210, the other engines 212, and the transaction engine 214 in providing, using, accounting and otherwise attending to uses of adaptive data operations by an adaptive 5G node on an individual basis, in a relay site capacity, or otherwise.

Site Database 228

The data storage device 216 may include a site database 228. The site database 228 may be a partition of a master ledger 216A, a separate ledger, and/or a separate database. For at least one implementation, the site database 228 may be maintained in a blockchain format. The site database 228 may be configured to store and provide data regarding one or more adaptive data processing resources and/or common resources accessible via an adaptive 5G node 200.

The site database 228 may identify one or more resource parameters associated with use the given adaptive 5G node 200. Non-limiting examples of such resource parameters include a device type, characteristics of the device, and otherwise. The site database 228 may be used by one or more of the signal broker engine 208, the data processing engine 210, the other engines 212, and the transaction engine 214 in providing, using, accounting and otherwise attending to uses of adaptive data processing resources and/or common resources by an adaptive 5G node on an individual basis, in a relay capacity, or otherwise.

Position Database 230

The data storage device 216 may include a position database 230. The position database 230 may be a partition of a master ledger 216A, a separate ledger, and/or a separate database. For at least one implementation, the position database 230 may be maintained in a blockchain format. The position database 230 may be configured to store and provide data regarding one or more adaptive data operations and/or common data operations accessible to an adaptive 5G node 200, and as further defined based on one or more identifiable locations.

The position database 230 may identify one or more position parameters associated with use the given adaptive 5G node 200. Non-limiting examples of such position parameters include other adaptive 5G nodes within range of the given adaptive 5G node based on a then arising and/or future arising positional determination, access times for use of such other adaptive 5G nodes, and otherwise. The position database 230 may be used by one or more of the signal broker engine 208, the data processing engine 210, the other engines 212, and the transaction engine 214 in providing, using, accounting and otherwise attending to uses of adaptive data processing resources and/or common resources by an adaptive 5G node on an individual basis, in a relay capacity, or otherwise, and as based on a positional determination.

Common Resource(s) Interface 232

An adaptive 5G node 200 may include a common resource(s) interface 232 that couples the adaptive 5G node 200 with one or more common resource(s) 233. For at least one implementation, a common resource may be provided separately from and/or in connection with an adaptive 5G node. Non-limiting examples of common resource(s) 233 include DSB satellite receivers, cable set-top-boxes, gaming consoles, A/V processing devices such as amplifiers, sound processors, video encoders/decoders, and any other device or system configured to manage data.

Input/Output Interface 234 and I/O Device(s) 236

An adaptive 5G node 200 may include an input/output (I/O) interface 234. The I/O interface 234 may be communicatively coupled to one or more I/O devices 236 such as, but not limited to, augmented reality glasses, video monitors, televisions, earbuds, speakers and/or other audible output devices, tactile signaling systems, such as those that vibrate or otherwise generate a human touch detectable signal, input devices, such as keypads, buttons, microphones, eye trackers, and otherwise. It is to be appreciated that a user may interact with an adaptive 5G node 200 in any desired manner, such as by speaking commands, selecting icons using buttons, touch pads, eye tracking, or otherwise. The I/O interface 234 may be configured for use with any known or later arising I/O technologies.

Security Interface 238

An adaptive 5G node 200 may include a security interface 238 that includes one or more hardware processor configured to execute one or more computer executable instructions. The security interface 238 may be configured to provide security features for secure data storage, secure communications, blockchain purposes, and otherwise. A non-limiting example of such a security features include the use of encryption, scrambling and other technologies. Security interface components, technologies and features are well known and any currently available and/or later arising security components, technologies, and features may be utilized.

Location Interface 240

An adaptive 5G node 200 may include a location interface 240 such as a GPS receiver or other position determining device, system or technology. Any currently available and/or later arising location determining technologies may be utilized.

Power Interface 242

An adaptive 5G node 200 may include a power interface 242 that includes one or more batteries or other electrical energy storage devices and/or connections to line power. Solar panels and the like may be connectable to recharge such batteries. The power interface 242 may provide power to one or more of the elements of an adaptive 5G node 200, monitor power usage, control power usage, and otherwise.

Network Interface 244

An adaptive 5G node 200 may include a network interface 244 that may include one or more connectivity elements for connecting with one or more LANs, WAN, WLANs, or otherwise. The network interface 244 may use any known or later arising networking technologies including Ethernet, Wi-Fi, and others.

Adaptive 5G Model

As shown in FIG. 3, an adaptive 5G model 300 for use with an adaptive 5G system may include various levels of operation. The adaptive 5G model 300 may include one or more operating levels including a radio layer 302, a path layer 304, a function layer 306 (such as is a given node operating as a source, relay, client, or otherwise), a transaction layer 308, and a blockchain ledgering layer 310 (such as one or more ledger processing applications and/or operations). For at least one implementation, one or more of the layers of the adaptive 5G model 300 may correspond, at least in part, to one or more layers of the Open Systems Interconnect (OSI) model. The layers of the adaptive 5G model 300 may correspond to one or more blockchain ledgers (herein, each an "adaptive 5G master ledger"). For at least one implementation, the adaptive 5G master ledger, or a sub-ledger component thereof, may use one or more known and/or later arising blockchain primitives. Non-limiting examples of such blockchain primitives include: Ethereum (ETH) technologies, such as those described at Ethereum.org, including the ETH currency; Cardano technologies, such as those described at Caradano.org, including the ADA currency; Non-Fungible Tokens (NFTs) and marketplaces for trading thereof, one such non-limiting example being the opensea.io trading platform and primitives used therewith; digital exchange platforms such as the dentwireless.com/exchange; and others.

Radio Layer 302

The radio layer 302 may identify one or more frequencies, frequency bands, radio types, processor requirements, or the like that are available for use in one or more adaptive 5G nodes to provide an adaptive 5G service at a given time. For at least one implementation, the radio layer 302 may be similar to the physical layer of the OSI model and accomplish the transmission, data processing, and other adaptive data operations with respect to raw bits and bit streams over one or more physical mediums (including RF mediums). For example, the radio layer 302 may identify radios and/or other data processing resources available, at a given time, in an adaptive 5G node for use to facilitate an adaptive 5G service, such as the providing of streaming video. A blockchain ledger (herein, an "adaptive 5G radio ledger") may be used. For at least one implementation, an adaptive 5G master ledger and/or an adaptive 5G radio ledger may include one or more of a unique identifier to a public blockchain and/or a blockchain trading pair between one or more cryptocurrencies and/or a given currency market such as but not limited to, a currency market denominated in United States Dollars.

Path Layer 304

The path layer 304 may identify one or more links, such as dedicated links and direct links, and/or one or more patterns, such as adaptive 5G tower patterns and adaptive 5G site patterns, available for use in an adaptive 5G system and at a given time. For at least one implementation, the path layer 304 may be similar to a combination of one or more of a data link layer, network layer, and transport layer of the OSI model. The path layer 304 may identify one or more data formats, primitives including, but not limited to one or more described above, and the like supported by one or more paths in a 5G system, one or more paths available to provide, process, or otherwise accomplish one or more adaptive data operations with respect to such data and/or other data, and otherwise. A blockchain ledger (herein, a "adaptive 5G path ledger") may be used.

Function Layer 306

The function layer 306 may identify one or more functions capable of being performed, being performed, and/or previously performed by a given adaptive 5G node. For at least one implementation, the function layer 306 may be similar to the session layer of the OSI model. The function layer 306 may identify one or more adaptive data operations and/or common data operations that a given adaptive 5G node supports in one or more roles, such as a source, relay, or client. A blockchain ledger (herein, an "adaptive 5G function ledger") may be used. An adaptive 5G system may be virtualized, via the adaptive 5G master ledger and/or one or more sub-ledgers, and account for one or more rewards arising from use and/or providing adaptive data operations, communications resources, common data operations, common resources, or otherwise. The adaptive 5G system may use a virtualized trading/reward scheme (herein, a "reward scheme") that provides "rewards", such as bitcoins or other exchangeable commodities. The adaptive 5G master ledger and/or one or more sub-ledgers may be used to track rewards. Rewards may be denominated in terms of financial debits and/or credits as defined in view of generally acceptable accounting practices. Rewards may be debited and/or credited to the adaptive 5G ledger(s) based on one or more uses and/or providing of capabilities for dynamic frequency roaming, for example a reward scheme based on MHz vs population, a megabytes utilized, local computing power, electrical power generated, provided or consumed, or otherwise. For at least one implementation, a communication of data between a sender and a designated, one or more, receiver(s) may be virtualized as an adaptive data pipe that results in the debiting and crediting of rewards to two or more adaptive 5G nodes. For example, a providing of the first direct link 106D(1) by the first adaptive 5G site 106 to the second adaptive 5G site 108, thereby facilitating communications with the first adaptive 5G tower 102, may result in rewards being credited to the account of the first adaptive 5G site 106 and rewards being debited from the account of the second adaptive 5G site 108—as maintained by the adaptive 5G master ledger and/or one or more sub-ledgers thereof.

The specific dedicated links and/or direct links used for a given communication between a sender and one or more recipients may be arbitrarily and dynamically assigned using a best available delivery method in view of a service level agreement (SLA) pricing model or other pricing model then in use. For an implementation, rewards may be debited/credited, as appropriate to adaptive 5G nodes based on demand for use of one or more dedicated links, direct links, processing resources, power resources, or otherwise. Such demand and the allocation of rewards may be based on real-time determinations, historical usage, anticipated usage (for example, use during a SUPER BOWL game), or otherwise.

Transaction Layer 308

The transaction layer 308 may identify one or more transactions performed by a given adaptive 5G node. For at least one implementation, the transaction layer 308 may be similar to the presentation layer of the OSI model in that it establishes a context between functions performed, paths used, and resources utilized by a given adaptive 5G node. The transaction layer 308 may identify business aspects, such as financial aspects, contractual aspects (e.g., contractual obligations fulfilled or unfulfilled), and others, arising from one or more uses of the adaptive 5G system by a given adaptive 5G node. A blockchain ledger (herein, an "adaptive 5G transaction ledger") may be used.

Blockchain Ledgering Layer 310

The blockchain ledgering layer 310 may identify blockchain ledgering operations initiated and/or performed by a given adaptive 5G node. For at least one implementation, the blockchain ledgering layer 310 may be similar to the application layer of the OSI model in that it the layer at which a user can track their uses, and any radio, path, resource and/or business aspects, of a given adaptive 5G node and the adaptive 5G system. The blockchain ledgering layer 310 may be further configured such that other adaptive 5G nodes, adaptive 5G system providers, regulators, and others may be informed of uses by one or more adaptive 5G nodes of the adaptive 5G system, while such information is secured in view of the immutable characteristics of blockchain ledgers, and provided/accessible in accordance with blockchain protocols, rules, security restrictions, anonymity considerations, and as otherwise established or later established for the given adaptive 5G system. A blockchain ledger (herein, an "adaptive 5G blockchain ledger") may be used. For at least one implementation, rewards may be redeemable for any use. For example, rewards credited to an account due to a providing of a direct link may be used, by an account holder or authorized user, for use in obtaining other adaptive 5G system resource utilizations, such as mobile direct links when traveling, computing resource sharing, electrical power use, such as battery recharging, or otherwise. Any currency and currency trading system, virtual or otherwise, may be used.

Figure 4:
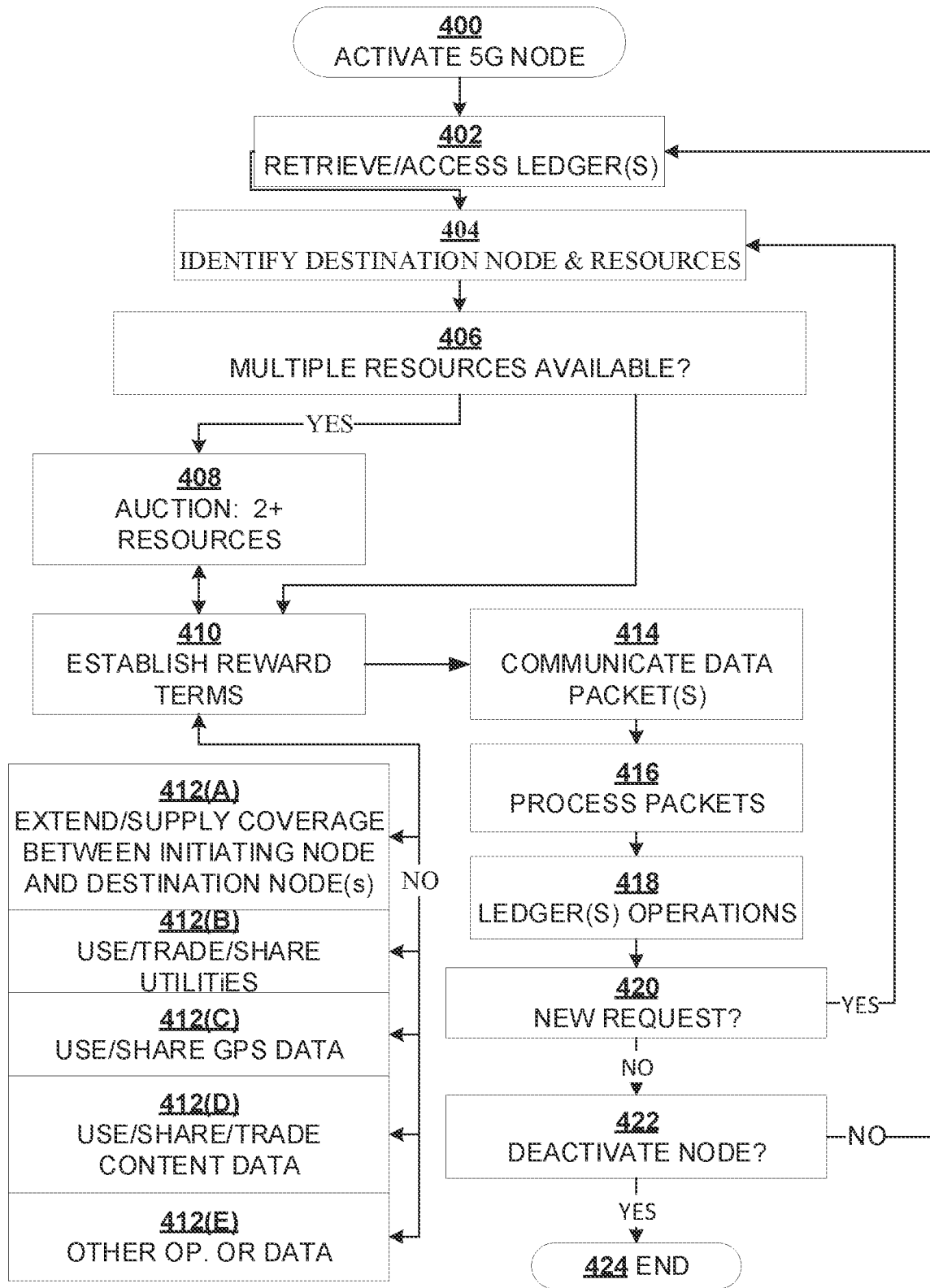
FIG. 4 is a flow chart illustrating a process for use of an adaptive 5G system and in accordance with at least one implementation of the present disclosure.

As shown in FIG. 4, a process for use of an adaptive 5G system may begin with an activation of an adaptive 5G Node (herein, the "initiating node") (Operation 400). The initiating node may stationary or mobile. The initiating node may be within RF signal distance, for one or more frequency bands of other adaptive 5G nodes including adaptive 5G tower nodes, adaptive 5G site nodes, and adaptive 5G mobile nodes. The initiating node provides a request to establish an adaptive 5G session that utilizes one or more communications resources, adaptive data processing resources and/or common resources.

Per Operation 402, the process may include the initiating node retrieving and/or accessing an adaptive 5G master ledger and/or one or more sub-ledgers, such as an adaptive 5G radio ledger identifying adaptive 5G nodes within RF range of the given adaptive 5G node, and other sub-ledgers.

Per Operation 404, the process may include identifying one or more destination nodes with respect to which the initiating node seeks to communicate and one or more adaptive 5G system resources needed for the given session. A resource may be needed to facilitate communications between the initiating node, for data processing, for power considerations, and/or for any other adaptive data operations and/or common data operations.

Per Operation 406, the process may include determining whether multiple communications resources are available to support the requested adaptive data operation(s). When multiple resources are available, the process may proceed to Operation 408. When a single resource is available, the process may proceed to Operation 410. It is to be appreciated that an auction may occur when multiple nodes are capable of performing one or more operations, such as Per Operation 408, when multiple resources and/or links are available to support a given session an auction process may be used to identify the node(s) providing the given resource(s). The auction process may establish one or reward terms, per Operation 410.

Per Operation 410, reward terms may be established for the given session. Such reward terms may be established in view of one or more reward parameters. Non-limiting examples of reward terms to be established may include terms regarding: extending/supplying of RF coverage between the initiating node and the one or more destination nodes (Operation 412(A)); using, trading and/or sharing of adaptive data processing resources ("utilities") (Operation 412(B)); using and/or sharing GPS data (Operation 412(C)); using, sharing and/or trading content data (Operation 412 (D)); other adaptive data operations and/or common operations (Operation 412(E)); and otherwise. The establishment of reward terms may occur between the initiating node and a single resource and/or one or more resources. The reward terms may be fixed, dynamically determined, determined based on an auction, or otherwise. Once the reward terms are established, the process proceeds with Operation 414.

Per Operation 414, the process may include communicating one or more data packets between the initiating node and the one or more destination nodes. Such communications may occur under first reward terms for first data packets and under second reward terms for second data packets.

Per Operation 416, the process may include performing one or more adaptive data operations on one or more data packets in accordance with the reward terms. Such operations may occur under first reward terms for first data packets and under second reward terms for second data packets. For at least one implementation, Operation 416 may not be performed.

Per Operation 418, the process may include performing one or more ledgering operations. Such ledgering operations may occur, after, or at any other designated instance while data packets are being communicated (per Operation 414) and/or processed (per Operation 416). For at least one implementation, ledgering operations are performed dynamically and in conjunction with other adaptive data operations. Ledgering operations may include communication of adaptive master ledger to other nodes within an adaptive 5G system at any desired frequency and/or at any desired time.

Per Operation 420, the process may include determining whether a new request is being presented by the initiating node. The new request may occur with each communication of data using the adaptive 5G system and/or other adaptive data operations. For example, each text message in a string of text messages may be considered to be a new request to use resources of the adaptive 5G system. When a new request is received, the process may resume at Operation 404.

Per Operation 422, the process may include determining whether the initiating node is to be deactivated or has been deactivated. Operation 422 may occur after some time period has elapsed between a use of the adaptive 5G system by the initiating node. For example, a given period of time has elapsed since the initiating node last sent or received a text message, terminated a streaming content session, or otherwise. Node deactivation may also occur based upon time schedules specified by the initiating node. For example, time periods establishing when the initiating node may be used to establish a direct link to another adaptive 5G node.

Per Operation 424, when the initiating node is deactivated, the process ends.

It is to be appreciated that the operations described above and depicted in FIG. 4 are illustrative and are not intended herein to occur, for a given implementation of the present disclosure, in the order shown, in sequence, or otherwise. One or more operations may be performed in parallel and operations may be not performed, as provided for any given use of an implementation of the present disclosure.

Although various implementations of the claimed invention have been described above with a certain degree of particularity, or with reference to one or more individual implementations, those skilled in the art could make numerous alterations to the disclosed implementations without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various implementations of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an implementation of the present disclosure. Other implementations are therefore contemplated. It is intended that all matter contained in the above description and shown in the accompanying drawings shall be interpreted as illustrative only of implementations and not limiting. Changes in detail or structure may be made without departing from the basic elements of the invention as defined in the following claims.

What is claimed is:

1. An adaptive fifth generation (5G) communications system comprising:
   an adaptive 5G tower;
   a first adaptive 5G site coupled by a dedicated link with the adaptive 5G tower; and
   a second adaptive 5G site coupled by a direct link with the first adaptive 5G site;
   wherein the direct link is established by the first adaptive 5G site and indirectly couples the second adaptive 5G site with the adaptive 5G tower;
   wherein data signals are communicated between the adaptive 5G tower and the second adaptive 5G site via the direct link and the dedicated link; and
   wherein use of the direct link is accounted for in a blockchain master ledger;
   wherein the block chain master ledger is separately maintained by each of the adaptive 5G tower, the first adaptive 5G site, and the second adaptive 5G site.

2. The adaptive 5G communications system of claim 1, wherein the blockchain master ledger corresponds to an adaptive 5G model.

3. An adaptive fifth generation (5G) communications system comprising:
an adaptive 5G tower;
a first adaptive 5G site coupled by a dedicated link with the adaptive 5G tower; and
a second adaptive 5G site coupled by a direct link with the first adaptive 5G site;
wherein the direct link is established by the first adaptive 5G site and indirectly couples the second adaptive 5G site with the adaptive 5G tower;
wherein data signals are communicated between the adaptive 5G tower and the second adaptive 5G site via the direct link and the dedicated link;
wherein use of the direct link is accounted for in a blockchain master ledger;
wherein the blockchain master ledger further comprises a relay ledger; and
wherein the relay ledger accounts for communication of the data signals with the second adaptive 5G site using the direct link.

4. The adaptive 5G communications system of claim 3, wherein the relay ledger corresponds to a radio layer of an adaptive 5G model.

5. The adaptive 5G communications system of claim 1, wherein the first adaptive 5G site is configured to perform adaptive data operations on one or more of the data signals communicated via the direct link to the second adaptive 5G site.

6. An adaptive fifth generation (5G) communications system comprising:
an adaptive 5G tower;
a first adaptive 5G site coupled by a dedicated link with the adaptive 5G tower; and
a second adaptive 5G site coupled by a direct link with the first adaptive 5G site;
wherein the direct link is established by the first adaptive 5G site and indirectly couples the second adaptive 5G site with the adaptive 5G tower;
wherein data signals are communicated between the adaptive 5G tower and the second adaptive 5G site via the direct link and the dedicated link;
wherein use of the direct link is accounted for in a blockchain master ledger;
wherein the first adaptive 5G site further comprises:
a first adaptive 5G site adaptive data processing resource;
wherein the blockchain master ledger further comprises a processing ledger; and
wherein the processing ledger accounts for data processing operations performed by the first adaptive 5G site data processing resource on the data signals.

7. The adaptive 5G communications system of claim 6, wherein the processing ledger corresponds to a function layer of an adaptive 5G model.

8. The adaptive 5G communications system of claim 1, wherein the first adaptive 5G site further comprises:
a network interface configured to establish a network link with a common resource.

9. The adaptive 5G communications system of claim 8, wherein the common resource further comprises an Internet Service Provider (ISP); and
wherein the ISP is configured to provide access to an Application Service Provider (ASP).

10. An adaptive fifth generation (5G) communications system comprising:
an adaptive 5G tower;
a first adaptive 5G site, coupled by a dedicated link with the adaptive 5G tower, including a network interface configured to establish a network link with a content streaming provider;
a second adaptive 5G site coupled by a direct link with the first adaptive 5G site;
wherein the direct link is established by the first adaptive 5G site and indirectly couples the second adaptive 5G site with the adaptive 5G tower;
wherein data signals are communicated between the adaptive 5G tower and the second adaptive 5G site via the direct link and the dedicated link;
wherein use of the direct link is accounted for in a blockchain master ledger;
wherein the first adaptive 5G site facilitates access by the second adaptive 5G site to the content streaming provider via the direct link and the network link; and
wherein the blockchain master ledger accounts for use of the direct link and the network link by the second adaptive 5G site to access the content streaming provider.

11. The adaptive 5G communications system of claim 10, wherein the network interface operates at a path layer of an adaptive 5G model.

12. An adaptive fifth generation (5G) communications system comprising:
an adaptive 5G tower;
a first adaptive 5G site coupled by a dedicated link with the adaptive 5G tower; and
a second adaptive 5G site coupled by a direct link with the first adaptive 5G site;
wherein the direct link is established by the first adaptive 5G site and indirectly couples the second adaptive 5G site with the adaptive 5G tower;
wherein data signals are communicated between the adaptive 5G tower and the second adaptive 5G site via the direct link and the dedicated link;
wherein use of the direct link is accounted for in a blockchain master ledger; and
wherein the blockchain master ledger further comprises a power ledger providing an accounting of electrical power used by the first adaptive 5G site to facilitate communication of the data signals using the direct link and the dedicated link.

13. The adaptive 5G communications system of claim 12, wherein the power ledger corresponds to a transaction layer of an adaptive 5G model.

14. An adaptive fifth generation (5G) communications system comprising:
an adaptive 5G tower;
a first adaptive 5G site coupled by a dedicated link with the adaptive 5G tower; and
a second adaptive 5G site coupled by a direct link with the first adaptive 5G site;
wherein the direct link is established by the first adaptive 5G site and indirectly couples the second adaptive 5G site with the adaptive 5G tower;
wherein data signals are communicated between the adaptive 5G tower and the second adaptive 5G site via the direct link and the dedicated link;
wherein use of the direct link is accounted for in a blockchain master ledger;
wherein the first adaptive 5G site further comprises:
an antenna;

a transceiver coupled to the antenna;
  wherein the antenna and transceiver facilitate the direct link and the dedicated link;
a data storage device configured to a local copy of the blockchain master ledger; and
a hardware processor, coupled to the antenna, the transceiver, and the data storage device, configured to execute non-transient computer instructions for facilitating a signal broker engine configured to manage use of the antenna and the transceiver for the direct link and the dedicated link.

15. The adaptive 5G communications system of claim 14,
wherein the non-transient computer instructions further comprise instructions for facilitating a data processing engine configured to manage use of adaptive data processing resources and common resources on behalf of the second adaptive 5G site.

16. The adaptive 5G communications system of claim 15,
wherein the common resource further comprises an Internet Service Provider (ISP); and
wherein the ISP is configured to provide access to an Application Service Provider (ASP).

17. The adaptive 5G communications system of claim 15,
wherein the non-transient computer instructions further comprise instructions for facilitating a transaction engine configured for participating in at least one of bidding, rationing, auctioning, allocating, and accounting for use of at least one of communications resources, the adaptive data processing resources, and the common resources.

18. The adaptive 5G communications system of claim 17,
wherein the transaction engine accounts for uses of communications resources, adaptive data processing resources and common resources in the blockchain master ledger.

19. The adaptive 5G communications system of claim 18,
wherein the first adaptive 5G site is further configured to establish a mobile direct link with an adaptive mobile device; and
wherein the first adaptive 5G site facilitates communication of mobile data between the adaptive mobile device and the adaptive 5G tower via the dedicated link and the mobile direct link.

20. The adaptive 5G communications system of claim 6,
wherein the blockchain master ledger further comprises a processing ledger; and
wherein the processing ledger accounts for data processing operations performed by the first adaptive 5G site data processing resource on the data signals.

* * * * *